(12) United States Patent  
Gresham et al.

(10) Patent No.: US 6,587,072 B1  
(45) Date of Patent: Jul. 1, 2003

(54) PULSE RADAR DETECTION SYSTEM

(75) Inventors: Robert Ian Gresham, Somerville, MA (US); Robert Egri, Wayland, MA (US)

(73) Assignee: M/A-Com, Inc., Lowell, MA (US)

( * ) Notice: Subject to any disclaimer, the term of this patent is extended or adjusted under 35 U.S.C. 154(b) by 0 days.

(21) Appl. No.: 10/104,633

(22) Filed: Mar. 22, 2002

(51) Int. Cl.$^7$ ............................................... G01S 1/02
(52) U.S. Cl. ........................... 342/70; 342/71; 342/72; 342/25
(58) Field of Search ........................... 342/70–72, 25, 342/134, 137, 200–202

(56) References Cited

U.S. PATENT DOCUMENTS

| | | | | |
|---|---|---|---|---|
| 3,680,104 A | * | 7/1972 | Westaway | 342/201 |
| 3,757,331 A | * | 9/1973 | Moulton | 342/149 |
| 5,731,781 A | * | 3/1998 | Reed | 342/135 |
| 5,864,313 A | * | 1/1999 | Speck et al. | 342/98 |
| 6,018,309 A | * | 1/2000 | Mitsumoto et al. | 342/109 |
| 6,067,040 A | * | 5/2000 | Puglia | 342/134 |

* cited by examiner

Primary Examiner—Thomas H. Tarcza
Assistant Examiner—Isam Alsomiri

(57) ABSTRACT

A radar based sensor detection system comprises a microwave source operative to provide a continuous wave signal at an output. A pulse-former is coupled to the output of the source and is operative to provide at an output a variable length pulse that increases the transmitted energy of the radar system according to the range of object detection. A modulator is coupled to the output of the pulse-former for providing a modulated pulse signal. A transmit receive switch coupled to the output of the modulator is selectively operative between a first transmit position and a second receive position. A transmit channel coupled to the transmit receive switch transmits the pulse signal when the switch is operated in the transmit position. A receiving channel coupled to the transmit receive switch receives the modulator signal when the switch is operated in the receive position. First and second voltage multipliers each have a local oscillator input for receiving the modulator signal in the receive position, and each have an input signal port, and an output port. A receiver channel receives a reflected transmitted signal from an output and applies the received signal to the receive signal input ports of the voltage multipliers. An autocorrelator coupled to the output ports of the voltage multipliers correlates the received signal to produce an output signal indicating the detection and position of the object.

20 Claims, 5 Drawing Sheets

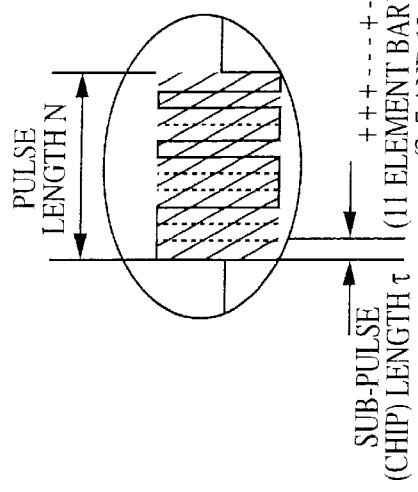
FIG. 3A
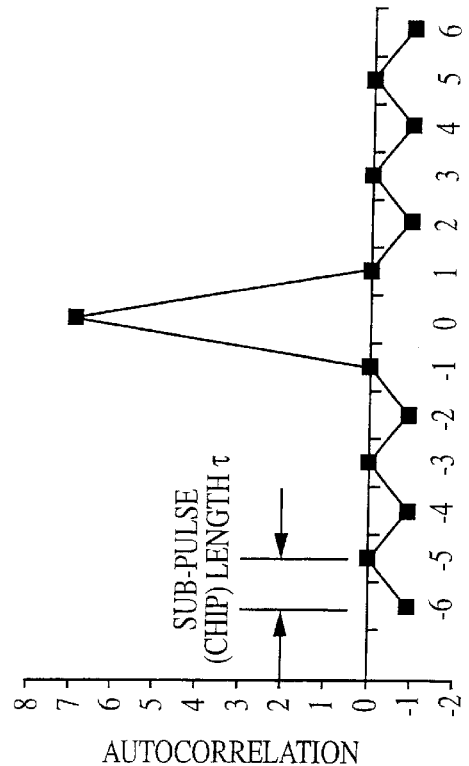
FIG. 3B
FIG. 3D
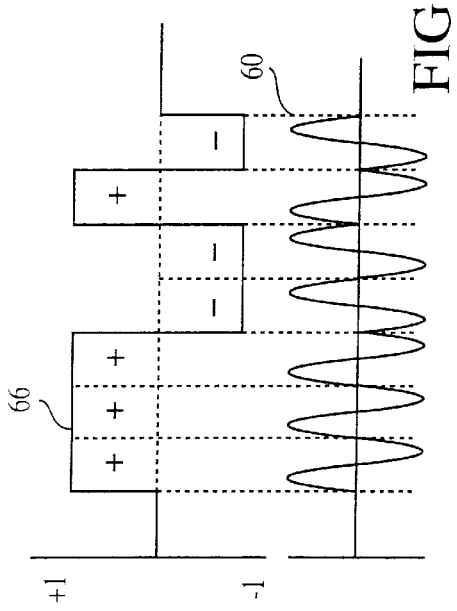
FIG. 3C

PULSE RADAR DETECTION SYSTEM

FIELD OF INVENTION

This invention relates to a short-range pulse-compression radar system particularly suitable for fabrication as an integrated circuit.

BACKGROUND OF INVENTION

A need exists for a short-range radar system, which, for example, is suitable for automotive and other commercial applications. Such a system would be enabled to sense the proximity of other vehicles and objects, moving or stationary, within a range radius of about 0.15 meters to 30 meters or beyond. Radar systems having automotive application have been proposed in the prior art, including systems utilizing radar for automatic braking, as well as warning the operator of the vehicle of an impending danger or obstruction such as an animal or person in the roadway.

In addition to object range detection, it is also useful to be able to distinguish or resolve the distance between two objects in very close proximity (e.g. when they are approximately 15 centimeters apart). An intelligent radar detection system comprises a number (one or more) of sensors that operate as a transceiver for electromagnetic energy. The sensors typically transmit and receive electromagnetic energy of a defined frequency and power via an antenna over a defined spatial area. In turn, the system receives echo signals from partial reflections of any illuminated objects in that area. The ability of the sensor to resolve two or more objects closely situated in the illuminated area leads to the descriptive name of high-resolution radar (HRR).

The prior art also refers to high range resolution monopulse radar systems which are designated (HRRM). See, for example, a text entitled, "Radar Handbook", Second Edition, by Merrill Skolnik, published by McGraw Hill, Inc. (1990). This text gives descriptions of radar systems, including high-resolution systems. As one can ascertain, there is a large potential market for automotive radars as well as for other commercial applications. Such applications include, but are not limited to, automatic door openers, sanitary facilities, electronic boundary detectors or fences, electronic camera focusing, navigation devices, parking aid sensors, and a host of other potential uses. However, in order to create a system for such markets, a technical solution must be provided that is not only capable of operating with the required degree of performance, but also offers a potential route to lower cost sensors. The price reduction should be able to take advantage of economies of scale and other established high volume manufacturing techniques. In addition, the sensor architecture should be sufficiently flexible to offer multiple operating modes to enable varying application and custom requirements depending upon the intended end use.

The prior art was cognizant of the need for low cost, high-resolution radars. Reference is made to U.S. Pat. No. 6,067,040 entitled, "Low Cost High Resolution Radar for Commercial and Industrial Applications", issued on May 23, 2000 to K. V. Puglia. The patent describes a low cost, high-resolution radar based detection system, which has a pulse repetition frequency generator connected to first and second narrow pulse modulators. The system employs a transmit channel which is connected to the first narrow pulse modulator and emits pulse modulator carrier based transmit signals having a prescribed frequency and a prescribed duration. The receive channel is connected to the second narrow pulse modulator. There is a time delay circuit which delays the output of the second pulse modulator to the receive channel and a mixer which mixes a portion of one of the pulse modulated carrier based transmit signals reflected from an object with the output of the second narrow pulse modulator.

PCT application entitled, "Sensor for Measuring a Distance from an Object" No. WO 00/43801 having a priority date of Jan. 20, 1999 and filed for Martin Reiche describes a sensor for measuring the distance from an object. The apparatus includes an oscillator which generates a carrier signal. A first modulation switch modulates pulses on a carrier signal and generates a first pulse signal. The first pulse signal is emitted in the direction of the object. The first pulse signal is reflected by the object and delayed by a propagation time. A power divider positioned between the oscillator and the first modulation switch transmits the carrier signal to a second modulation switch. The second modulation switch modulates the pulses on to the carrier signal and generates a second pulse signal that is delayed by a variable delay. One compares the delay of the second pulse signal with the propagation time of the first pulse signal to detect the propagation time and determine the distance to the object.

An aspect of the invention is to increase the pass-band transmission loss of the modulation switches by providing for a third modulation switch which is positioned between the oscillator and the power divider. As one can see from the above-noted techniques, the typical operating scenario presented in the above systems are based on a combination of discrete circuit components combined with distributed transmission line elements on a soft substrate. These prior art approaches can lead to a combination of manufacturing tolerance issues and operating scenarios that compromise the performance of the sensor. It is understood that the design and assembly of the sensor based on discrete components leads to a relatively large device. The functional operation of the sensors is restricted for both size and cross constraints as each additional circuit block is relatively expensive to add. The use of distributed transmission line circuitry is a common technique for the design of high frequency microwave and millimeter circuits, but is based on the fundamental assumption that standing waves are present in the circuit. This assumption no longer holds true under short pulse conditions, and can lead to transient and short-term circuit effects that reduce the operating margin and compromise sensor performance. Lastly, the mid- to long-range operation of the short pulse sensor is not optimum due to two issues. The energy received by the sensor from partial reflection of the detected objects varies as an inversely proportional function of the fourth power of the object's range. As the range increases, the ability of the sensor to detect objects rapidly decreases as a function of the greatly reduced energy incident upon, and reflected from objects. Conventionally, there are two limitations that restrict the amount of energy (power) that may be transmitted by the sensor: the ability to discriminate between two targets (range discrimination) is a function of the pulse-length in pulsed-radar systems, and the chirp or frequency modulation bandwidth in a CW radar system. A longer pulse length increases the amount of energy transmitted by the sensor with a consequent reduction in the ability of the sensor to discriminate between closely located objects. Also, the interval between pulses (or pulse repetition frequency (p.r.f)) may not be reduced indiscriminately to increase the transmitted energy for the need to maintain an unambiguous range measurement. In addition, the sensor is susceptible to in-band interference sources that produce and transmit electromagnetic energy in the same portion of the electromagnetic spectrum as that of the sensor. The forms of the interfering sources include CW or pulsed transmission by other systems, mutual interference from a second sensor or sensor system operating with the same or similar purpose, self-jamming through imperfect isolation between the transmit and receive port antennae, and wide-band thermal noise.

Thus, one can readily understand that these problems increase with such sensor devices that are used in, for example, the automotive industry. For example, hundreds of cars on a single highway may all be generating and receiving signals operative in the same radar range or at similar frequency bands.

In accordance with an aspect of the present invention; a variable length pulse is introduced that increases the transmitted energy of a sensor at longer ranges. The superimposition of a short duration phase coding on the expanded transmitted pulse is used to maintain the required range resolution of the sensor for the instances of longer pulse duration. The phase coding is also useful in increasing sensor immunity to interference from other sources. In addition, by making the specific phase-code variable as a function of range, the p.r.f. of the sensor can be increased without compromising range ambiguity. Other circuit functions that supplement and enhance this process include varying the pulse repetition frequency of the transmit sequence—both over time and as a function of the range-gate under observation, adding frequency modulation to the local oscillator within the sensor and a variable gain amplifier used to control and vary the amount of energy transmitted at any instance by the sensor. The receiver of the sensor includes a two step pre-detection integration process to ensure that the reflected energy captured by the sensor is as large as possible at a given instant to maximize the likelihood of a correct detection decision.

The increased functionality of the sensor according to the present invention can be addressed while simultaneously considering the issue of manufacturability and cost. A system embodying an aspect of the present invention incorporates circuit functions into either a single transceiver integrated circuit (IC) or a dual IC chipset comprising a separate transmitter and receiver IC, or a combination thereof. The high integration capability of integrated circuit processes allows several circuit functions to be located in close proximity on a single chip. In addition, the reduced circuit size and interconnect distance between components allows circuits to be designed using conventional analog and lumped circuit theory. This technique eliminates the need for distributed circuit design that is not ideal for short pulse transient conditions. The circuit is preferentially designed using balanced circuit configurations to maximize common-mode noise rejection, although single-ended circuit designs are also possible. The integrated circuit process that is preferred for accomplishing enhanced operation and increased circuit density is a Silicon Germanium (SiGe) process that includes both bipolar transistors and CMOS transistors as part of the same circuit (BiCMOS). Other suitable technologies that are also considered useful are SiGe bipolar only processes; and III–V processes such as GaAs or InP based MESFETs, pHEMTs, or HBT devices. It is understood that such integrated circuit techniques can be employed because of the system architecture and because of the way the system is implemented using a variable pulse length that basically increases the transmitted energy of the sensor at longer ranges.

An improved short-range radar system suitable for automotive and other short-range commercial applications for sensing the proximity of vehicles or objects within a radius ranging from about 0.1 meters to about 30 meters and beyond.

An aspect of the present invention is embodied in a system architecture for a short-range radar system which is capable of being implemented utilizing conventional integrated circuit techniques.

A further aspect of the present invention is the use of variable length phase codes whose code length may be varied as a function of range to provide increased immunity to interference sources; the ability to transmit longer pulses with a short-phase code to maintain short-range discrimination, and the ability to use the variable length code as a means of maintaining a relatively high p.r.f. compared to conventional radar sensors while still maintaining a high unambiguous range.

BRIEF DESCRIPTION OF THE DRAWINGS

FIGS. 3A through 3D show a series of timing diagrams and waveforms, including a table necessary to explain operation of the pulse-coded, pulse-compression radar sensor system as depicted in FIG. 1.

DETAILED DESCRIPTION OF THE INVENTION

Figure 1:
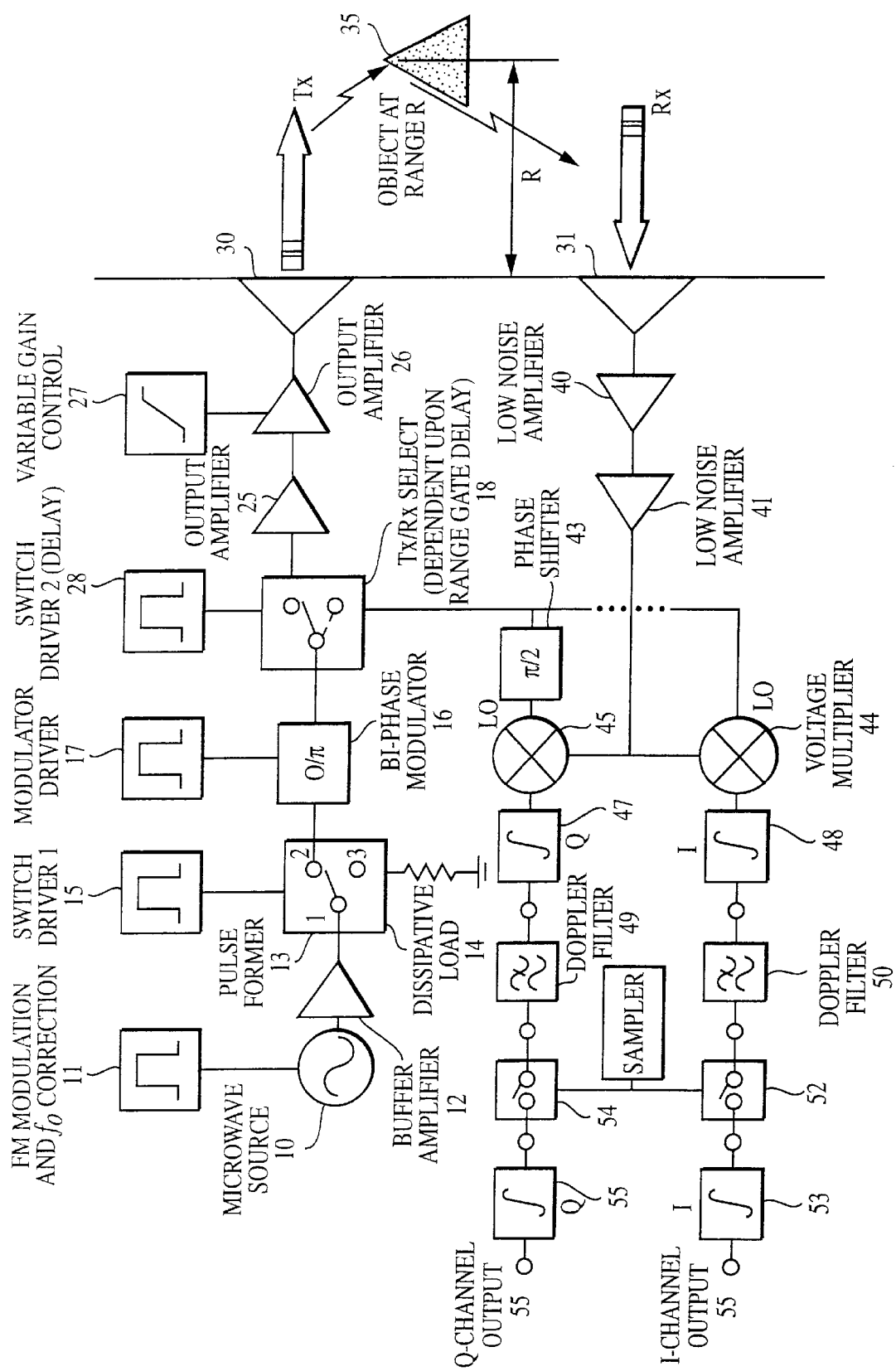
FIG. 1 is a block diagram of a pulse-coded, pulse-compression radar sensor according to an aspect of the present invention.

Referring to FIG. 1 there is shown a sensor architecture of a high-resolution radar (HRR) according to an aspect of the invention. The general principle of operation of a typical radar sensor is that of object detection, position and velocity measurement. In a typical radar, a carrier signal is transmitted from the sensor via an antenna. The antenna may be fixed, or steered where the focus of the beam may be dynamically varied by electronic, or mechanical control. In FIG. 1, there is shown a separate transmit antenna ($T_x$) 30 and a receive antenna ($R_x$) 31. Adjacent to the transmit antenna is an arrow designated $T_x$ indicative of a transmitted signal. Similarly, there is an arrow showing a received signal at the receive antenna 31 designated as $R_x$. Thus, one can use a separate antenna for transmit and receive, but is also possible to use a single antenna to perform transmit and receive operation by adding additional switching elements without changing the principal of the described invention.

The transmitted signal $T_x$ is partially reflected by an object 35 at a range R from the plane of the transmit and receive antennas or from the plane of the sensor.

The transmit operation is as follows. As shown in FIG. 1, microwave source or oscillator 10 generates a carrier signa,l which is a continuous wave (CW) signal. This CW signal may be either free-running, or frequency or-phase-locked to an external reference oscillator. The microwave source 10 typically would operate in the C-Band range of 4 to 8 GHz (Giga-Hertz) or in the X-Band range of 8 to 12 GHz, 18–25

GHz or higher frequencies. The ability to discriminate a range of 0.15 m (meters) requires a signal with frequency spectrum characteristics of at least 2 GHz in width, which may: achieved through 'chirping' or modulating a CW signal over a 2 GHz frequency range, or by having a 0.5 nS (nanosecond) or shorter duration pulse. Thus, the transmitter is transmitting pulses, each pulse lasting for a duration number of frequency cycles at the above noted frequencies for C or X-Band, or other frequency-band operation. This is illustrated, for example, in the lower waveform of FIG. 3A. The microwave source is also coupled to FM modulator and frequency correction module 11. The frequency of the carrier signal that emanates from the microwave source 10 can be varied by applying a short term modulating signal that is superimposed on the carrier frequency. This short-term modulating signal is generated by the FM modulation module 11. Frequency correction may be some form of control voltage that stabilizes the frequency of the oscillator within a defined frequency range as a function of temperature or other environmental sources of variation and may be achieved using the aforementioned frequency or phase locking techniques. Such operation can be implemented by a voltage control tuning port associated with the microwave oscillator 10. Such voltage control of an oscillator is well known and a standard technique is the use of a variable reactance device whereby frequency deviation of the microwave source 10 is proportional to the magnitude of an applied DC or AC control signal. Such oscillators are sometimes referred to as voltage controlled oscillators (VCO). Many well known examples of voltage controlled oscillators which can be employed as microwave sources include use of varactor diodes or other variable controllable reactant devices. The FM modulation module 11 provides correction to the microwave source 10 and is used to vary and compensate for changes in source frequency as a function of external influence such as temperature, power supply variation and other variable parameters. Techniques for stabilizing the output frequency of a microwave source 10 according to temperature variations and so on are also well known. The output of the microwave source 10 is coupled to the input of a buffer amplifier 12. The input of the buffer amplifier 12 is coupled to the signal output of the oscillator 10 for the purpose of isolating the oscillator from variations in the output load network as a function of switching transients. The amplifier 12 may provide gain which results in an increase of the magnitude of the carrier signal at the amplifier output. The main function of the amplifier 12 is to reduce the effect of frequency pulling. Frequency pulling is an effect an oscillator undergoes as the magnitude and/or phase of the load network changes. The oscillator 10 provides a continuous wave (CW) output carrier signal. The carrier signal (transmitted pulse) used for object detection is formed by gating the oscillator or CW carrier signal for a prescribed amount of time with a pulse-forming network or pulse-former 13. Pulse-former 13 is shown in FIG. 1 as an ideal implementation of a two or three port switch network that constitutes either an absorptive single-pole single-throw (SPST) switch, or a single-pole double-throw (SPDT) switch. One of the two selected arms (3) is terminated in a matched or dissipative load 14. The usual condition of the switch is in the state where the output of the amplifier 12 is coupled and directed to the dissipative load or resistor 14. In this manner, terminal 1 or the input terminal of the pulse-former is connected to terminal 3, which is the terminal connected to the dissipative load 14. The pulse-former 13 is gated to direct energy towards position 2 of the ideal switch as a function of the transmit pulse interval, and as a function of the range gated time delay. Thus, as seen there is a switch driver module 15 coupled to the pulse-former 13 and which controls the state of the pulse-former according to desired operation.

When the input terminal 1 of the pulse-former 13 is connected to position 3, then the output of the buffer amplifier 12 is shunted to ground through the dissipative load 14. When the switch driver 15 controls the pulse-former 13 so that the switch input terminal 1 is connected to output terminal 2, the output signal from the buffer amplifier 12 is directed to an input terminal of a bi-phase modulator 16. The pulse-former switch 13 can be implemented by many known circuit configurations. Field effect transistor (FET) switches are well known and large-scale integration technology takes advantage of many possibilities offered by MOS silicon gate transistors as used in switches, as well as bipolar transistors, PIN diodes, plus many other devices.

During the pulse formation process, the CW oscillator 10 output which is generated at the output of buffer amplifier 12 is connected to the output path of the pulse-former switch indicated by position 2 for a length commensurate with the length of pulse to be generated. The pulse length is determined by an appropriate control signal generated by the switch driver 15 and is a function of the range R under consideration by the sensor and the length of the particular phase-code to be superimposed by the bi-phase modulator 16.

There are two different functions performed by the switch driver 15. The first function is to control the width of the carrier pulse by gating the CW source signal between ports 2 and 3. The second function of the switch driver 15 is to determine the period between generating the pattern of pulses (i.e. pulse repetition frequency or p.r.f.). As will be understood, the sensor transmits multiple pulses at the object 35 located at range R at a frequency determined by the pulse repetition frequency. This frequency may be varied dynamically in order to help reduce the effects of mutual interference from other sensors and sources operating at similar carrier frequencies. The pulse repetition frequency is defined as the inter-pulse period between two pulses transmitted by the sensor. As the same microwave source 10 and the pulse-forming network 13 are used to also form the local oscillator (LO) function of the receiver, the switch driver 15 is additionally used to gate pulses from the pulse-former 13 at times in between the sending of transmit pulses.

The bi-phase modulator 16 is controlled by the modulator driver 17. The number of phase flips and their polarity relative to a non-modulated pulse are determined by the modulation driver 17. The output of the bi-phase modulator 16 is directed to an input of a switch 18 designated as a $T_x/R_x$ switch or a transmit/receive select switch. The transmit pulse once formed takes on the property of a wideband frequency domain signal centered about the CW carrier frequency of the microwave source 10. The output signal pulse thus has a Fourier transform that comprises a center frequency at the carrier frequency and Fourier components expanding on the order of $1/\tau$, $\tau$ where $\tau$ is the pulse width. The nature of the pulse generated will be described further in conjunction with FIG. 3. The transmit pulse as indicated above is directed to the input of the phase modulation network 16 that operates to superimpose a single or sequence of phase inversions on the carrier pulse. This is achieved by passing the pulse through the bi-phase modulator 16. The modulator 16 either preserves the existing phase of the pulse signal, or inverts the phase by 180°. This operation, as indicated, is under the control of the modulator driver 17. The amplitude characteristics of the pulse ideally remain the same regardless of the superimposed phase condition. For the sensor to act as an ideal correlation receiver where the characteristics of the received pulse are compared with a locally generated replica of the transmitted pulse, it is important that any distortion introduced by the circuitry is common (in so much as it is possible) between the original transmit pulse, and the replica pulse used for the receive functionality.

As indicated, the number of phase-flips and the polarity of flips relative to a nonmodulated pulse are determined by the modulator driver 17. This is a function of the pulse length, which is in itself a function of the object detection range R of the sensor at any given instant. The length of each phase-flip is equal to the shortest pulse available from the pulse-forming network 13 and multiples thereof. Specifically, the nominal (shortest) pulse duration or length typically available from the pulse-forming network 13 is approximately 400 pS (pico seconds), which may be considered as a single pulse and the most fundamental mode of operation of the sensor. The particular length of the shortest pulse need not be 400 pS, but is dependent upon, and a function of, the required range resolution desired of the sensor. The sensor transmits single chip pulses without adding a phase modulation for near-range operation, as for ranges of less than 10 meters, for example. The associated range resolution of a 400 pS pulse is approximately 12 centimeters.

The process of pulse-compression allows the radar sensor to utilize a longer pulse to increase the radiated energy, while,simultaneously maintaining the range resolution of a short pulse. The more specific form of pulse-compression utilized takes a long pulse designated as a chip of duration T and divides it into N sub-pulses of length τ. The phase of each sub-pulse is then selected to be either 0 or π radians. The pulse format as well as other aspects are shown in FIG. 3 and will be explained subsequently. Although the choice of the phase of the sub-pulse, whether it be 0 or π may be made at random, some sequences are preferable for certain radar applications. One criterion for judging the quality of the sequence is by accessing the time-sidelobe level of the autocorrelation function of the sequence. It is desirable that the time-sidelobe level of the sequence should be equal and at a minimum level when compared with the peak value of the autocorrelation function. One such sequence is known as the Barker code sequence, although any function possessing an appropriate autocorrelation function may be used. The values of these time-side lobes relative to the chip-length (number of sub-pulses) and the appropriate phase coding of the sequence are shown in FIG. 3.

Figure 5:
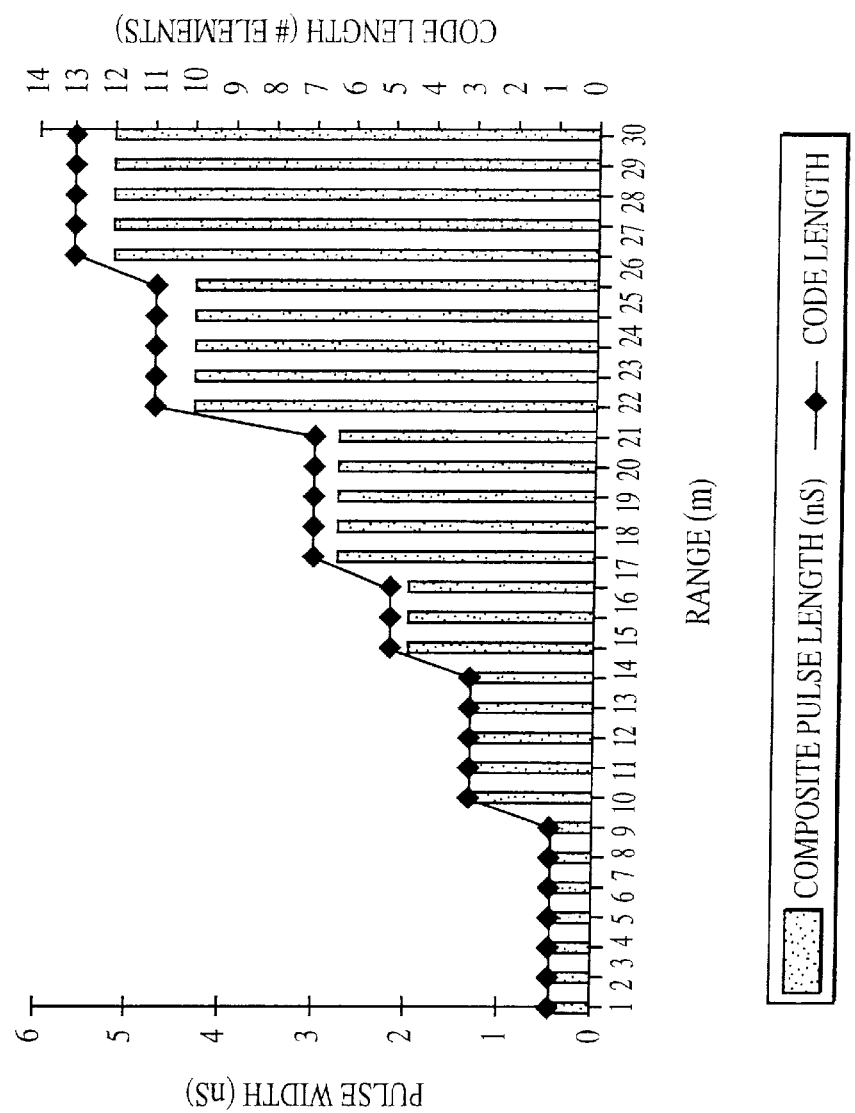
FIG. 5 is a chart showing an example of how as the pulse-length transmitted by the sensor increases as a function of range, the phase-code superimposed on the pulse may also be varied.

Thus, the radar sensor when operated in different operating modes can transmit a chip comprising a single sub-pulse where the code length is equal to 1 (pulse-length τ) for objects in the near-range distance and to gradually increase the length of the chip (code-length) to include 7, 11 or 13 sub-pulses (resulting in a total pulse length of 7τ, 11τ, or 13τ. This increase in the length of the chip will occur as the range of the radar is increased. This can be done automatically by control of the pulse former and the modulation driver. The chart in FIG. 5 illustrating an example of how the pulse-length and its corresponding phase-code may be changed as a function of range, shows a sequence of phase-codes of length τ, 3τ, 5τ, 7τ, 11τ, and 13τ, although other combinations of this are possible.

A consideration in realizing pulse-compression radar is that the receiver presents a matched filter response to the received signal. This is required so that the expanded signal may be compressed and the appropriate information recovered while maximizing the available signal to noise ratio in the receiver. A technique for realizing a matched filter receiver is to have a correlator as the conversion mechanism for translating the carrier frequency received signal down to a base-band representation. A matched filter is usually defined as a structure whose impulse response in the frequency domain is the complex conjugate representation of the received signal. The time domain equivalent of the matched filter is the process of correlation whereby the received signal is multiplied by a time-delayed version of itself and the output of the product is integrated over a specified time or predetermined period. Thus, the same network that is used for the generation of the transmit pulse sequence in the transmit path is also used in the receive process or the receive path.

As seen in FIG. 1, the output of the bi-phase modulator is directed to an input of a $T_x/R_x$ select switch 18 which is shown in the transmit position (closed). The switch 18 is further controlled by a switch driver 28. The switch driver 28 generates a time delay that is dependent upon the range gate. During the transmit process, the switch 18 connects to the output amplifiers 25 and 26. The output amplifier 26 may be coupled to a variable gain control 27 and the output of the amplifier 26 is coupled to the transmit antenna 30. The generated signal at the output of amplifier 26 is the transmitted signal which, as indicated, is partially reflected from the object 35 at range R. As indicated above, during the transmit path operation, the switch 18 is connected to the output amplifiers 25 and 26 and the transmitted pulse is increased in amplitude level and radiated from the transmit antenna 30. The amplification of the transmitted pulse is, of course, due to the gain or power gain of output amplifiers 25 and 26. The amount of amplification applied to the transmit pulse may be controlled by adjusting the variable gain control 27, which again is a well known technique. The output gain of amplifier 26 can thus be controlled by a variable gain circuit 27. As indicated, the switch 18 operation is controlled by the switch driver 28 which includes a time delay depending on the range gate. During the transmit process, the switch 18 is connected to the output amplifiers 25 and 26, while during the receive mode, the switch (dashed) connects the output of the phase modulator 16 to the receive path. The switch driver 28 connects the output of the bi-phase modulator 16 to the receive path, namely to be applied by a local oscillator (LO) signal to voltage multipliers or mixers 44 and 45. A second pulse replicating the last pulse transmitted with appropriate phase modulation is formed and is coupled to the local oscillator ports of the voltage multipliers 44 and 45 incorporated in the receive path. The receiving antenna 31 receives a reflected signal from object 35. The signal is passed to input low noise amplifiers 40 and 41 where it is amplified. The input amplifiers are, of course, low noise amplifier devices which are also well known. The output from the bi-phase modulator 16 and transmit/receive switch 18 is divided into two equal parts using any one of well known power division techniques. The first part is now connected to an input of a phase-shifter 43 and to the LO input of the first multiplier designated 44. The output of the phase shifter is connected to the LO input of the second voltage multiplier 45. An input to each of the multipliers is derived from the output of the low noise amplifier 41, which essentially is the received signal amplified. Two voltage multipliers 44 and 45 are employed so that one provides an in-phase or I signal and the other provides a quadrature or Q signal. The quadrature LO drive is derived from the LO pulse signal from the bi-phase modulator 16, and delaying the signal by 90° at the carrier frequency. This delay is accommodated by phase shifter 43 for voltage multiplier 45.

The output of each voltage multiplier 44 and 45 is associated with a respective integrating circuit 47 and 48. The integrating circuits can include a capacitor or other storage device and basically perform part of the autocorrelation function on the received signal as present at the output of amplifier 41. The recovered signal information is then filtered by means of Doppler filters 49 and 50 to produce based-band only signals. These signals from the filters 50 and 51 are then directed to the input switches 52 and 53, which are operated by a sampler circuit 51. The recovered signal information as filtered is switched, which is also designated as an integrate and dump process, and the switch outputs are applied to second integrators 53 and 55. The integrators 53 and 55 are designated as I channel output and Q channel output, respectively.

The sampler 51, which controls the switches, opens and closes the switches 52 and 54 at the pulse repetition frequency rate. The usual state of the switch 54 is to be open so that no connection is made between the Doppler filters 49 and 50 and the second stage integrators 53 and 55. The cumulative information from a number of pulses is then gathered using the second stage integration process before a detection decision is made. The ability of the radar sensor to adequately operate is enhanced by the use of the phase-coded, pulse-compression scheme, which is made possible by taking advantage of the increased integration and functional capability of the integrated circuit solution.

As indicated above, the same microwave source and pulse forming network are used to also perform the local oscillator (LO) function of the receiver. The multipliers 45 and 44 receive the actual output from the bi-phase modulator through the transmit receive switch 18. This output, of course, is derived from the microwave source 10 and is the local oscillator signal. The switch driver 15 is additionally used to gate pulses from the pulse-former at times in between the sending of transmit pulses. This second operation occurs at a variable rate and is commensurate with the returned flight time of an electromagnetic pulse to the object 35 at the range R under consideration. The sensor is operated in the mode where the delay remains constant over a number of pulses, thus allowing the sensor to be monitoring through multiple pulses a particular range for a particular length of time. Alternatively, the delay may be varied as a function of time corresponding to the sensor scanning a succession of different ranges in searching for an object or dynamically tracking a moving object. It is, of course, understood that digital pulse-compression techniques routinely use both filter generation and a matched filtering of radar waveforms. For example, Barker codes, which represent a special class of binary codes, are known to be used. The peak of the autocorrelation function is N and the magnitude of the minimum peak side-lobe is 1 where N is the number of sub-pulses determining the length on the code. For additional information, the reader is directed to pages 10.17 et seq. of "Radar Handbook" (second edition, 1990) which discusses Barker codes under pulse-compression radar.

Referring to FIG. 3A, there is shown a diagram depicting one phase-coding of a pulse sequence according to an aspect of the present invention. As seen, a pulse can vary between a +1 and −1 level (+,−). This corresponds to a definite transmission of a certain number of carrier wave signals during the pulse sequence. Thus, for example, as shown in FIG. 3A, the microwave source 10 is represented by the waveform 60 of FIG. 3A. The frequency of the microwave source is equivalent to one cycle of the sinusoidal waveform. The microwave oscillator 10 coupled to the buffer amplifier 12, is modified by the pulse-former module 13 associated above. The switch driver 15 produces the signal 60. This signal 66 thus controls the number of cycles of transmission of the microwave oscillator and basically would be the signal at the output of the pulse-former 13(terminal 2). The output of the switch driver is the signal 66 shown in FIG. 3A.

FIG. 3B shows a magnified time base, depicting a pulse length N, a sub-pulse (chip) length $\tau$ indicative of an 11 element Barker code, which also can include 2 to 7 and 13 as well. As is well known, for the optimal binary codes and dependent on the length of the code N, one can now determined a magnitude of minimum peak side-lobe. The table in FIG. 3C shows the length of code N, then shows the code sequence in the second column and then shows the peak side-lobe ratio in decibels (−db). Thus, for a length N of 2, the peak side-lobe ratio is 6. For a length N of 7, the peak side-lobe ratio is 16.9. The known Barker codes are codes which have a minimum peak-side lobe of one. There are no Barker codes greater than 13, as presently understood. Thus, compression radar using these Barker codes is normally limited to a maximum compression ratio of 13.

FIG. 3D shows the range bin versus autocorrelation and indicates the effects of a sub-pulse (chip) length $\tau$. It is seen that autocorrelation increases substantially during the range bin and therefore autocorrelation can be easily implemented. Basically, correlation processing operates on the principle that the spectrum of the time convolution of two waveforms is equal to the product of the spectrum of these signals. The same range samples have to be provided by one correlation processor, the number of samples in the fast Fourier transform (FFF) should equal N+the number of samples in the reference waveform. These added N samples are filled with zeros in the reference waveform FFT. For extended range coverage, repeated correlation operations are required with range delays of N samples between adjacent operations. The entire aspect of the system in implementing a pulse-compression scheme using pulse-coding makes the integration circuit process extremely simple and very convenient to utilize. As indicated above, the increase in functionality of the radar system considers the issue of inexpensive manufacturing and costs by enabling one to incorporate the circuit functions as described in FIG. 1 into either a single transceiver integrated circuit (IC) or a dual IC chip set comprising separate transmitter and receiver ICs, or any such appropriate combination of the functions. The high integration capability of integrated circuit processes permits all the circuit functions described in FIG. 1 to be positioned in close proximity on a single chip. In addition, the reduced circuit size in interconnect distance between components allows circuits to be designed using conventional analog and lumped circuit theory. This removes the need for distributed circuit design, which is not suitable for short-pulse transient conditions.

As indicated, the circuits can preferably use balanced circuit configurations to maximize common mode noise rejection. However, single ended circuit designs are also contemplated. The integrated circuit process that is preferred for accomplishing the enhanced operation, including circuit density, is a silicon germanium (SiGe) process that includes both bipolar transistor and CMOS transistors which are part of the same circuit. Other technologies that are also considered useful are silicon germanium bipolar only processes and gallium arsenide (GaAs) processes based on MESFETs and pHEMTs or HBT devices. Thus, the circuits used to implement the devices shown in FIG. 1 are available and are well known. For example, MOS devices have been utilized to provide switching techniques, modulators, oscillators, amplifiers, multipliers, integrators, as well as filters.

Figure 2:
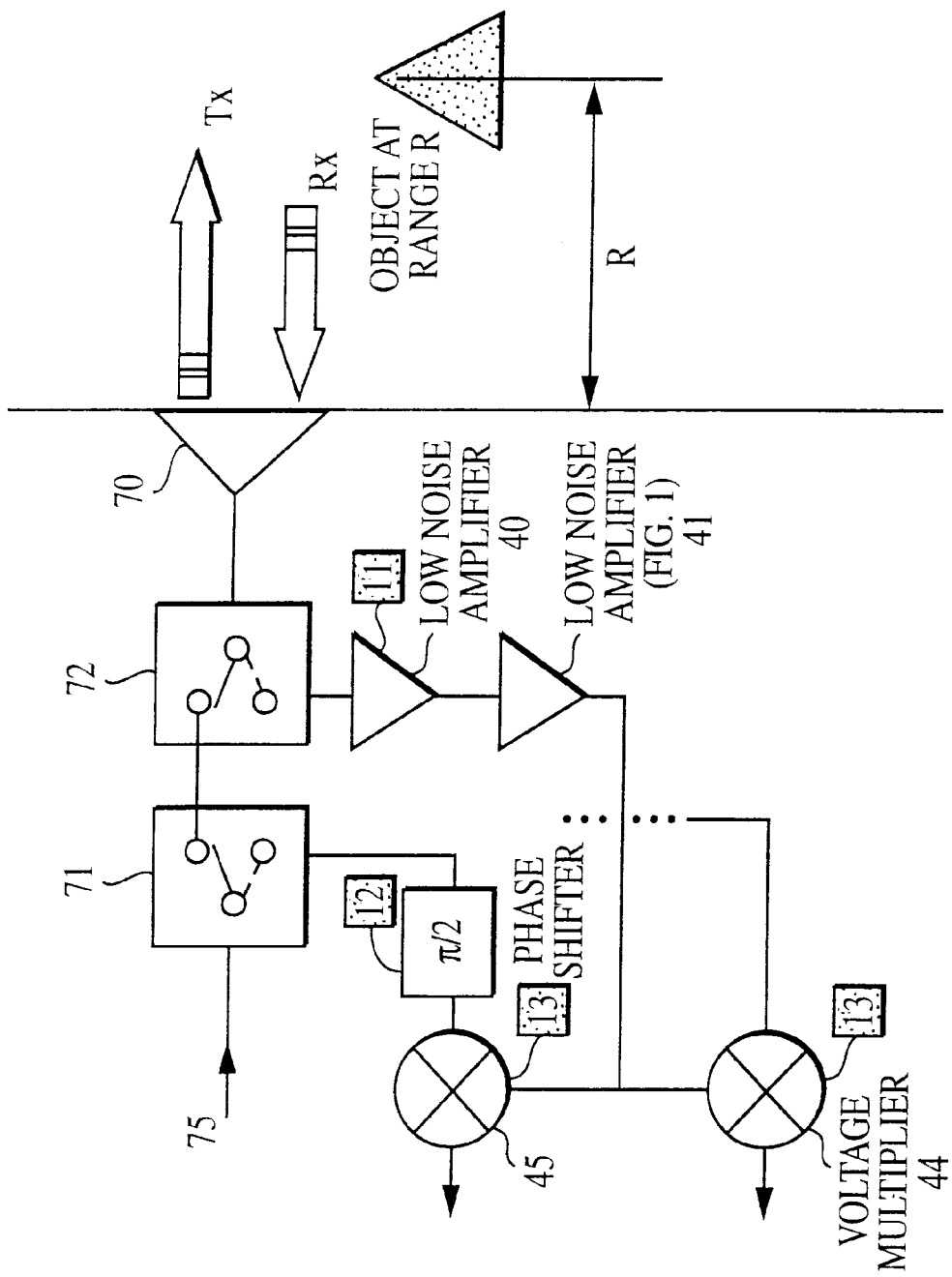
FIG. 2 is a schematic diagram of an alternate embodiment of a transmit/receive (T/R) switch used to provide a single antenna according to an aspect of the present invention.

Referring to FIG. 2, as indicated above, there is shown a schematic diagram of an alternate embodiment which utilizes a single antenna 70 as both a transmit and a receive antenna. The switches 71 and 72 are shown in FIG. 2 in the ($T_x$) transmit position. The position shown in FIG. 2 specifies that the output of amplifier 26 (FIG. 1) is coupled to the input terminal 75. This output would be directly transmitted to common antenna 70. During the receive mode, switches 71 and 72 are operated in the dashed line position where the antenna 70 is now coupled to the input of low noise amplifiers 40. The output of amplifier 41, as indicated, in conjunction with FIG. 1 goes to the voltage multipliers 44 and 45, as indicated. It is noted that switches 71 and 72 can also be controlled by a separate control means or processor which may also control, for example, the modules 11, 15, 17, 28 and 27. It is, of course, understood that each of the modules, as described above, can be controlled by a central processing element, or can be controlled by internal timing programs.

Figure 4:
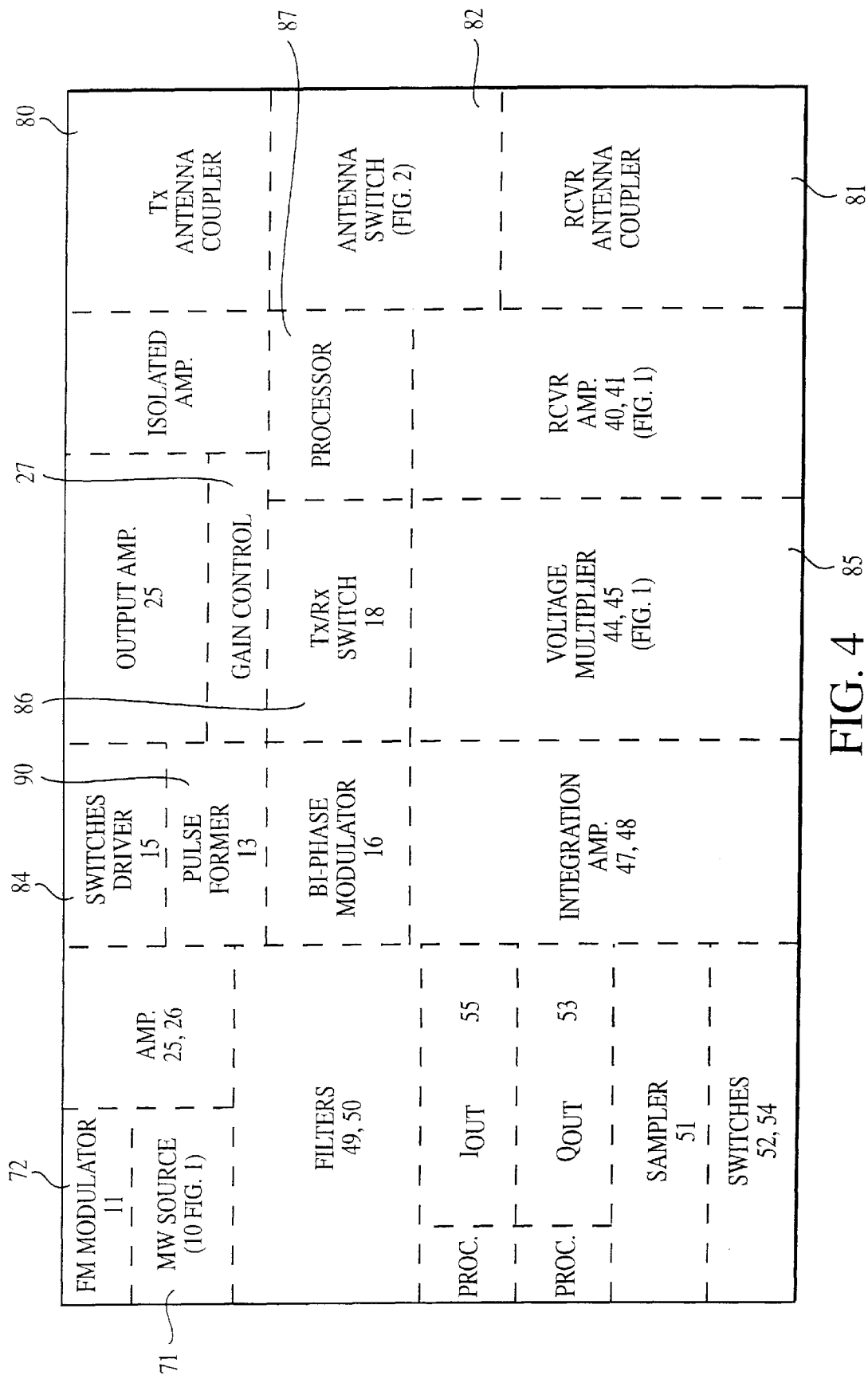
FIG. 4 is a top view of a typical integrated circuit layout for a radar sensor according to an aspect of the present invention.

Referring to FIG. 4, there is shown a typical layout for an integrated circuit, which is in a single transceiver integrated circuit (IC). It is understood that the chip can also be implemented as a separate transmit and receive IC. Essentially, the entire chip is fabricated on a wafer 70 which is typically a semiconductor wafer such a silicon, germanium, or a combination of silicon and germanium, gallium arsenide, or other semiconductor materials. The modules as described in FIG. 1 can be implemented by conventional semiconductor circuitry which is available. The implementations can include FET devices, as well as Schottky diodes, PIN diodes and other microwave devices. These devices can be switched using control pulses. Many of the circuits can also be implemented using CMOS inverter technology. It is indicated that the above-noted system includes a microwave source or oscillator 71 operating in the 4 to 8 GHz, or other appropriate microwave frequency. Microwave oscillator 71 can be fabricated using many different devices, including bipolar or field effect transistors as well as Gunn devices. Modulator 72 (reference numeral 11 of FIG. 1) associated with the microwave source (reference numeral 10 of FIG. 1) is positioned above the source in an area to cause the least amount of interference. As one can ascertain, the items depicted in FIG. 1 are shown and labeled on the substrate 70 to show, for example, a typical layout. It is also noted that the receive and transmit antennas represent standard antenna arrays and do not have to be part of the IC, but can be separate antenna structures or IC devices. Although an essential part of any radar sensor, the antenna structures may not be included on the IC but may be part of a larger assembly.

The chip 70 includes a transmit antenna coupler or path 80 and a receive antenna coupler or path 81. Also positioned on the substrate 70 is the antenna switch 82 of FIG. 2. The antenna switch 82 would operate as shown in FIG. 2. Other components, for example, the voltage multipliers are shown as reference numeral 85 (44 and 45 of FIG. 1). The transmit switch 85 is positioned generally in a central area of the chip to reduce interference. As indicated, the amplifiers, filters, switches and other devices shown in FIG. 1 can be implemented using FETS, or other devices. See, for example, text entitled, "Monolithic Microwave Integrated Circuits" published by the IEEE Press, edited by Robert A. Pucel, 1985. See also a text entitled, "Introduction to Microwave Circuits" by Robert J. Weber published by EEE Press (2001). Both texts show circuit applications in oscillators, amplifiers, transmit/receive modules and circuits which include low noise amplifiers and other devices. One skilled in the art will understand and realize that there are numerous circuit configurations which can be employed. It is, of course, also understood that FIG. 4 is a substantially enlarged representation of an integrated circuit and such circuits are, for example, extremely small in the millimeter range.

Also shown in FIG. 4 is processor module 87 for controlling the switching or driving of the various drivers or switches to change the timing relationships or to further assure that switching takes place at desired intervals. It is obvious to one skilled in the art how the intervals are selected, as it is clear that the chips provided in regard to pulse length and number of pulses are a function of the radar range. It is also seen in FIG. 4, that the receiver channel or path is basically confined to the bottom half of the chip, while the transmitting channel or path is confined to the top half of the chip. It is understood that two separate chips can be implemented, as well as the single chip shown above. The two chips can be fabricated on different wafers using, for example, different technologies. For example, certain of the components may be fabricated as gallium arsenide components for the higher power transmitting chip, while silicon fabrication may be provided for lower power modules.

FIG. 5 is a chart showing an example of how the pulse length transmitted by the sensor increases as a function of range. It is seen from FIG. 5 that the phase code, which is superimposed on the pulse, may also be varied. Thus, in FIG. 5, the range is shown in meters as the X axis, while the pulse width, as well as the code length, is shown on the Y axis.

Thus, a transmitter for a high resolution radar system comprises a microwave oscillator for providing at an output a continuous wave signal at a predetermined frequency, and a pulse-former having an input coupled to the output of the oscillator and a first and a second switchable output whereby the oscillator signal can be applied to either output according to a control signal applied to a control terminal of the pulse-former. A switch driver having an output coupled to the control terminal of the pulse-former is operative to selectively switch the output of the pulse-former between the first and second outputs to provide at the first output a pulse comprising a number of oscillator cycles indicative of a desired pulse to pulse interval and selected according to a range gated time delay. A bi-phase modulator has an input coupled to the first output of the pulse-former to provide at an output a bi-phase modulated signal. An antenna coupled to the output of the bi-phase modulator transmits the bi-phase modulated signal according to a selected object range.

Further, a receiver for a high resolution radar of the type having a transmitter for transmitting a phase coded pulse compression signal, comprises a receive antenna capable of receiving a reflected signal from an object positioned to interrupt the transmitted signal and intercept a portion of the signal to the receiver antenna to provide the signal at an output. First and second voltage multipliers each heave a local oscillator input port and a receive signal input port and each have an output port, wherein the receive antenna output is coupled to the receiver input port of the first and second multipliers. A microwave oscillator synchronized to the transmitter signal provides at an output a continuous wave signal at a predetermined frequency. A pulse-former has an input coupled.to the output of the oscillator and a first and a second switchable output, whereby the oscillator signal can be applied to either output according to a control signal applied to a control terminal of the pulse-former. A switch driver has an output coupled to the control terminal of the pulse-former and is operative to selectively switch the output of the pulse-former between the first and second outputs to provide at the first output a pulse comprising a number of oscillator cycles indicative of a desired pulse to pulse interval and selected according to a range gated time delay. A bi-phase modulator has an input coupled to the first output of the pulse-former to provide at an output a bi-phase modulated signal, and a phase shifter having an input coupled to the output of the bi-phase modulator to provide a phase shifted signal at an output, with the output of the phase shifter coupled to the local oscillator input port of the first voltage multiplier. The output of the bi-phase modulator is coupled directly to the local oscillator input port of the second voltage multiplier, and the output port of the first modulator provides a quadrature output (Q) signal and the output port of the second voltage multiplier provides an in-phase (I) output signal. An autocorrelator responsive to the I and Q signals from the voltage multipliers processes the signals for providing a detection signal indicative of the presence and distance of the object.

Still further, a radar based sensor detection system comprises a microwave source operative to provide a continuous wave signal at an output. A pulse-former is coupled to the output of the source and is operative to provide at an output a variable length pulse that increases the transmitted energy of the radar system according to the range of object detection. A modulator is coupled to the output of the pulse-former for providing a modulated pulse signal. A transmit receive switch coupled to the output of the modulator is selectively operative between a first transmit position and a second receive position. A transmit channel coupled to the transmit receive switch transmits the pulse signal when the switch is operated in the transmit position. A receiving channel coupled to the transmit receive switch receives the modulator signal when the switch is operated in the receive position. First and second voltage multipliers each have a local oscillator input for receiving the modulator signal in the receive position, and each have an input signal port, and an output port. A receiver channel receives a reflected transmitted signal from an output and applies the received signal to the receive signal input ports of the voltage multipliers. An autocorrelator coupled to the output ports of the voltage multipliers correlates the received signal to produce an output signal indicating the detection and position of the object.

Thus, a radar system providing a variable length pulse increases the transmitted energy of the transmitted portion of the sensor at longer ranges. There is a superimposition of a short duration phase-coding on the expanded transmitted pulse, which is used to maintain the required range resolution of the sensor for the instances of longer pulse duration. The phase-coding is also used for increasing the sensor's immunity to interference from other sources. The phase-coding applied to the transmitted pulse may be varied as a function of range or distance to provide further immunity and allow for a higher than usual p.r.f. for the radar while maintaining an appropriate unambiguous range. Other circuit functions that supplement and enhance the process include varying the pulse repetition frequency of the transmit sequence, adding frequency modulation to the local oscillator within the sensor and a variable gain amplifier to control and vary the amount of energy transmitter at any instance by the sensor. The receiver portion of the sensor uses a two-step pre-detection integration process to insure the reflected energy captured by the sensor is as large as possible at a given instant to maximize the likelihood of a correct detection decision. The increased functionality of the sensor is addressed while considering the issue of low cost in manufacturing and simple operation. Therefore, one can incorporate certain functions into it either a single transceiver integrated circuit (IC) or a dual IC chip set comprising a separate transmitter and receivers. The high integration capability of integrated circuit processes allows several circuit functions to be located in close proximity on a single chip.

While the foregoing invention has been described with reference to the above embodiments, various modifications and changes can be made without departing from the spirit of the invention. Accordingly, all such modifications and changes are considered to be within the scope of the appended claims.

What is claimed is:

1. A transmitter for a high resolution radar system, comprising:
    a microwave oscillator for providing at an output a continuous wave signal at a predetermined frequency,
    a pulse-former having an input coupled to said output of said oscillator and a first and a second switchable output whereby said oscillator signal can be applied to either output according to a control signal applied to a control terminal of said pulse-former,
    a switch driver having an output coupled to said control terminal of said pulse-former and operative to selectively switch said output of said pulse-former between said first and second outputs to provide at said first output a pulse comprising a number of said oscillator cycles indicative of a desired pulse to pulse interval and selected according to a range gated time delay,
    a bi-phase modulator having an input coupled to said first output of said pulse-former to provide at an output a bi-phase modulated signal, and
    an antenna coupled to said output of said bi-phase modulator for transmitting said bi-phase modulated signal according to a selected object range.

2. The transmitter according to claim 1 further comprising:
    an amplifier having an input coupled to the output of said phase modulator and an output coupled to said antenna, said amplifier having a gain control input,
    a variable gain control circuit coupled to said gain control input of said amplifier for varying the gain of said amp. lifier and therefore the magnitude of the transmitted signal.

3. The transmitter according to claim 2 further comprising:
    a modulation driver coupled to said modulator for controlling the number of phase inversion of said modulator as a function of said selected object range.

4. The transmitter according to claim 1 further comprising:
    a dissipative load coupled to said second switchable output of said pulse-former for dissipating said oscillator signal when said pulse-former is switched to said second output.

5. The transmitter according to claim 1 further comprising:
    an FM modulation circuit coupled to said oscillator for varying the frequency of said oscillator signal in a direction to compensate for changes in temperature or power supply variations.

6. The transmitter according to claim 1 wherein said oscillator, pulse-former, switch driver, bi-phase modulator and antenna are fabricated on a common substrate to provide a transmitter integrated circuit (IC).

7. A receiver for a high resolution radar of the type having a transmitter for transmitting a phase coded pulse compression signal, comprising:
    a receive antenna capable of receiving a reflected signal from an object positioned to interrupt said transmitted signal and intercept a portion of said signal to said receiver antenna to provide said signal at an output,
    first and second voltage multipliers, each having a local oscillator input port and a receive signal input port and each having an output port,
    said receive antenna output coupled to said receiver input port of said first and second multipliers,
    a microwave oscillator synchronized to said transmitter signal to provide at an output a continuous wave signal at a predetermined frequency, a pulse-former having an input coupled to said output of said oscillator and a first and a second switchable output whereby said oscillator signal can be applied to either output according to a control signal applied to a control terminal of said pulse-former, a switch driver having an output coupled to said control terminal of said pulse-former and operative to selectively switch said output of said pulse-former between said first and second outputs to provide at said first output a pulse comprising a number of said oscillator cycles indicative of a desired pulse to pulse interval and selected according to a range gated time delay, a bi-phase modulator having an input coupled to said first output of said pulse-former to provide at an output a bi-phase modulated signal, a phase shifter having an input coupled to said output of said bi-phase modulator to provide a phase shifted signal at an output, with said output of said phase shifter coupled to the local oscillator input port of said first voltage multiplier, with said output of said bi-phase modulator coupled directly to said local oscillator input port of said second voltage multiplier, said output port of said first modulator providing a quadrature output (Q) signal and said output port of said second voltage multiplier providing an in-phase (I) output signal, an autocorrelator responsive to said I and Q signals from said voltage multipliers to process said signals for providing a detection signal indicative of the presence and distance of said object.

8. The receiver according to claim 7 further comprising:

first and second integrators each having an input and an output, the input of said first integrator coupled to the output of said first voltage multiplier, with the input of said second integrator coupled to the output of said second voltage multiplier, first and second Doppler filters each having an input and an output, with the input of said first filter coupled to the output of said first integrator and with the input of said second filter coupled to the output of said second integrator, the outputs of said Doppler filters coupled to the input of a switching circuit switched at a pulse repetition rate to provide an output signal indicative of information relating to said object.

9. A radar based sensor detection system, comprising:

a microwave source operative to provide a continuous wave signal at an output, a pulse-former coupled to said output of said source and operative to provide at an output a variable length pulse that increases the transmitted energy of said radar system according to the range of object detection, a modulator coupled to said output of said pulse-former for providing a modulated pulse signal at an output, a transmit receive switch coupled to the output of said modulator and selectively operative between a first transmit position and a second receive position, a transmit channel coupled to said transmit receive switch for transmitting said pulse signal when said switch is operated in said transmit position, a receiving channel coupled to said transmit receive switch for receiving said modulator signal when said switch is operated in said receive position, first and second voltage multipliers each having a local oscillator input for receiving said modulator signal in said receive position and each having an input signal port, and an output port, a receiver channel for receiving a reflected transmitted signal from an output and applying said received signal to said receive signal input ports of said voltage multipliers, an autocorrelator coupled to said output ports of said voltage multipliers for correlating said received signal to produce an output signal indicating the detection and position of said object.

10. The system according to claim 9 wherein said modulator is a bi-phase modulator for providing a sequence of phase inversions as a function of a desired pulse length indicative of said object detection range.

11. The system according to claim 9 wherein said pulse-former includes a switch driver operative to gate said applied oscillator signal.

12. The system according to claim 9 further including a single antenna, switch coupled to said antenna and operative between a transmit position and a receive position wherein said transmit position is coupled to said transmit channel and said receive position is coupled to said receive channel said switch operative between said positions to employ said single antenna for both transmit and receive operations.

13. The system according to claim 9 wherein said variable length pulse consists of a chip consisting of a single sub-pulse for objects with a close range distance and consisting of increased length chips of seven, eleven or thirteen sub-pulses as the range distance is increased.

14. The system according to claim 12 further including a switch driver coupled to said transmit receive switch for controlling the switching between said receive and transmit positions according to a time delay as a function of the range distance of an object.

15. The system according to claim 9 wherein said receive channel provides a matched filter response to said received signal.

16. The system according to claim 15 wherein said matched filter response has an impulse response in a frequency domain which is the complex conjugate of the received signal.

17. The system according to claim 9 wherein said transmit channel includes an output amplifier having an input coupled to the transmit position of said transmit receiver switch and an output coupled to a transmit antenna, said amplifier having a variable gain control for controlling the magnitude of the transmitted pulse signal.

18. The system according to claim 9 wherein said pulse-former includes a switch operative between a first position coupling said microwave source output to said modulator, and a second position coupling said microwave source output to a dissipative load for directing said microwave signal in said second position to said load, a modulator driver coupled to said switch and operative to control said switch between said first and second positions.

19. The system according to claim 10 wherein the pulse length from said pulse-former varies as controlled by said modulator driver and according to desired object ranges.

20. The system according to claim 9 wherein said microwave source, said pulse-former, said modulator, said transmit-receiver switch, said transmit and receive channels, said first and second voltage multipliers and said autocorrelator are fabricated on a common substrate to provide a radar based sensor integrated circuit (IC).

* * * * *